(12) United States Patent
Matuschczyk

(10) Patent No.: US 6,584,688 B2
(45) Date of Patent: Jul. 1, 2003

(54) PROCESSES FOR MANUFACTURE OF A PRESS JACKET

(75) Inventor: Uwe Matuschczyk, Geislingen (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 10/138,571

(22) Filed: May 6, 2002

(65) Prior Publication Data

US 2002/0125604 A1 Sep. 12, 2002

Related U.S. Application Data

(62) Division of application No. 09/460,427, filed on Dec. 14, 1999, now Pat. No. 6,406,414.

(30) Foreign Application Priority Data

Dec. 23, 1998 (DE) .......................... 198 60 099

(51) Int. Cl.[7] .............................. B21K 1/02; B25F 5/02; F16C 13/00
(52) U.S. Cl. ................... 29/895.32; 29/895.3; 264/327; 264/328.16; 492/48; 492/50
(58) Field of Search ................ 29/895, 895.3, 29/895.32; 521/904; 264/327, 328.16; 492/48, 50

(56) References Cited

U.S. PATENT DOCUMENTS

| | | | |
|---|---|---|---|
| 2,336,384 A | * | 12/1943 | Baker et al. |
| 3,075,956 A | * | 1/1963 | Shields et al. |
| 3,408,341 A | * | 10/1968 | Joyner et al. |
| 4,015,320 A | * | 4/1977 | Meckel et al. |
| 4,242,783 A | * | 1/1981 | Watanabe et al. |
| 4,254,011 A | | 3/1981 | Bier |
| 4,404,161 A | | 9/1983 | Bier |
| 4,576,845 A | | 3/1986 | Krotchko |
| 4,606,994 A | | 8/1986 | Illers et al. |
| 4,650,193 A | | 3/1987 | Molitor et al. |

(List continued on next page.)

FOREIGN PATENT DOCUMENTS

| | | |
|---|---|---|
| DE | 3410638 | 10/1985 |
| DE | 3912093 | 10/1990 |

(List continued on next page.)

OTHER PUBLICATIONS

Publication, Biederbick, Karlheinz: Kunstoffe, Vogel–Verlag, 1974, third edition.

(List continued on next page.)

Primary Examiner—Gregory Vidovich
Assistant Examiner—Eric Compton
(74) Attorney, Agent, or Firm—Greenblum & Bernstein, P.L.C.

(57) ABSTRACT

Process for manufacturing a roll press jacket, wherein the roll press jacket includes a hollow cylindrical sleeve made of an castable elastomeric material containing at least one crystallization component, the sleeve has an interior cylindrical surface and an exterior cylindrical surface. The internal surface and the external surface have different hardness characteristics. The process includes using a cylindrical casting mold having an casting surface, the casting mold having a temperature which is maintained at a temperature colder than an elastomeric material being cast, casting a hollow cylindrical sleeve from the elastomeric material on the casting mold, the elastomeric material containing at least one crystallization component, providing the sleeve with an interior cylindrical surface and an exterior cylindrical surface, one of the internal or external surfaces being formed against the casting surface of the cylindrical casting mold, wherein the surface of the sleeve which is formed against the casting surface is harder than a surface which is not formed against the casting surface.

15 Claims, 2 Drawing Sheets

U.S. PATENT DOCUMENTS

| | | |
|---|---|---|
| 4,880,501 A | 11/1989 | Schiel |
| 4,889,674 A | 12/1989 | Krenkel et al. |
| 4,978,428 A * | 12/1990 | Cronin et al. |
| 5,118,391 A | 6/1992 | Matuschczyk et al. |
| 5,134,010 A | 7/1992 | Schiel |
| 5,145,935 A | 9/1992 | Hayashi |
| 5,223,203 A | 6/1993 | Seifert et al. |
| 5,525,194 A | 6/1996 | Jermo |
| 5,533,941 A | 7/1996 | Heim |
| 5,609,811 A | 3/1997 | Jermo |
| 5,766,421 A | 6/1998 | Anfrecht |
| 5,836,242 A | 11/1998 | Aberg |
| 5,860,360 A | 1/1999 | Lane, III et al. |
| 6,042,695 A * | 2/2000 | Ishino |
| 6,168,740 B1 | 1/2001 | Koch et al. |
| 6,406,414 B1 * | 6/2002 | Matuschczyk |

FOREIGN PATENT DOCUMENTS

| | | |
|---|---|---|
| DE | 4333641 | 7/1994 |
| DE | 4443598 | 6/1996 |
| DE | 19654194 | 6/1998 |
| DE | 19654751 | 7/1998 |
| EP | 0221336 | 5/1987 |
| EP | 0221339 | 5/1987 |
| EP | 0361419 | 4/1990 |
| JP | 9-19988 | 1/1997 |
| WO | 95/29293 | 11/1995 |

OTHER PUBLICATIONS

Article by Zamore, A, EBXL TPU A New Material for Medical and Industrial Applications, Mar. 1997.

TONE® Polyois for High–Performance Urethane Elastomers and Adhesives. Union Carbide 1997.

Article by Buist, J.M. & Gudgeon, H. Advances in Polyurethane Technology 1968.

Wright, P. & Cumming, A. P. C. Solid Polyurethane Elastomers. 1969.

* cited by examiner

PROCESSES FOR MANUFACTURE OF A PRESS JACKET

CROSS-REFERENCE TO RELATED APPLICATIONS

The present application is a divisional application of application Ser. No. 09/460,427, now U.S. Pat. No. 6,406,414 filed on Dec. 14, 1999, the disclosure of which is expressly incorporated by reference herein in its entirety. Additionally, this application claims priority under 35 U.S.C. §119 of German Patent Application No. 198 60 099.2, filed on Dec. 23, 1998, the disclosure of which is expressly incorporated by reference herein in its entirety.

BACKGROUND OF THE INVENTION

1. Field of the Invention

The invention relates to a cylindrical press jacket made of a castable elastomeric material for use on a press device which treats materials in the form of a web. The press device is particularly used for dewatering or smoothing a fibrous material web. The jacket will also have reinforcement threads and/or reinforcement fabric embedded in the elastomeric material and is made with the hardness of the material in the area of the interior side being different from the exterior side of the press jacket. A process for manufacturing the press jacket is also disclosed.

2. Discussion of Background Information

Press jackets are generally known, for example, from DE-OS 196 54 194 and DE-OS 196 54 751; in particular, which use reinforcement threads and cast the press jacket from a homogeneous material. They use relatively large distances between the reinforcement threads to facilitate their manufacture which allows the material to sufficient penetration the spaces formed between these distances.

The manufacturing the jacket in a single casting process also has the advantages of being simpler to manufacturing and producing a jacket with improved strength.

However, depending on the application, it may be necessary to make the jacket with different hardness characteristics between interior and exterior sides. For example, a harder exterior side has advantage with regard to improved abrasion resistance. This characteristic is especially desired when the press jacket is to have grooves or blind holes for receiving the pressed-out water. In contrast, a harder interior side allows for less oil absorption and improves the running properties of hydraulically supported press jackets.

SUMMARY OF THE INVENTION

The invention provides for a press jacket and a manufacturing process in which the press jacket has different hardness characteristics between its interior and exterior sides. Moreover, the jacket is made from an elastomeric material which contains at least one component which causes stronger crystallization in the area of the casting mold during casting on a relatively cold casting mold.

The jacket ideally cast against a mold which is colder than the jacket material being cast. The surface formed against the colder mold generally experiences stronger crystallization, and the result is a generally higher proportion of hard segments being formed on this surface. Thus the surface which is formed against the mold will be harder than the other parts of the jacket.

The elastomer material may be, for example, polyurethane and made include polymers or prepolymers, such as diphenylmethan—diisozyanate (MDI) with polyester, since they are appropriate as components for strengthen crystallization. In addition, the elastomeric material should also contain a cross-linker.

The differences in the hardness between the interior and exterior sides should be in the range of approximately 2 to 7 Shore A. For example, one side may have a hardness in the range of approximately 92 to 96 shore A, while the other side has a hardness of approximately 94 to 98 shore A. However, each surface may also be as low as approximately 85 shore A is desired.

By manipulating the manufacturing process, it is therefore possible to influence which side is to be made harder. Thus in order to manufacture a harder interior side, the elastomeric material is applied to the exterior side of a cylindrical casting mold, since a surface which is formed against a mold surface will be made harder. If it is desired to make the exterior side harder, then the elastomeric material is applied to the interior side of a hollow cylindrical casting mold, again since a surface which is formed against a mold surface will be made harder. Preferably the jacket is cast using conventional centrifugal or hot-casting techniques such as those discussed in U.S. Pat. No. 5,766,421. Moreover, the particulars of such conventional molding are identified in each of U.S. Pat. Nos. 5,118,391 and 5,134,010, which are fully incorporated by reference. These conventional techniques being modified by the use of a mold which is colder than the casting material as described herein.

In either case the temperature of the casting mold should be controlled between approximately 10 and 100° C., and preferably between approximately 20 and 80° C., colder than the temperature of the elastomeric material being cast. For it is this cold mold effect which causes a elastomer material formed against it to become harder. Preferably, the mold is preheated to the desired temperature. For this purpose, a heavy steel mold is preferred since it can maintain the desired temperature for a relatively long period of time.

Even more control over the formation of the various degrees of hardness is improved by the use of reinforcement threads or the reinforcement fabric, because this acts as an insulating layer and therefore limits the temperature effect of the cold casting mold to the area between the contact or forming surface and the reinforcement threads or reinforcement fabric. The reinforcing fibers made be those which are conventionally and can include polyester, polyamid, and/or aramid.

According to one aspect of the invention, there is provided a cylindrical press jacket for treating a material web which includes a hollow cylindrical sleeve made of an castable elastomeric material containing at least one crystallization component, wherein the sleeve has an interior cylindrical surface and an exterior cylindrical surface, and one of reinforcement threads and reinforcement fabric embedded in the elastomeric material, such that the hardness of the elastomeric material in an area of the interior surface differs from a hardness of the exterior surface. The jacket may be made using a casting mold which is colder than the elastomeric material being cast. The cold casting mold may be positioned against the interior surface so as to cause a greater crystallization to occur in on the interior surface relative to the exterior surface. Alternatively, the cold casting mold may also be positioned against the exterior surface so as to cause a greater crystallization to occur in on the exterior surface relative to the interior surface. Moreover, the jacket may be used for one of dewatering and smoothing a fibrous material web. The greater crystallization may correspond to greater hardness.

The invention also provides that the crystallization component includes a polymer. The polymer may be a prepolymer. The difference between the hardness of the interior surface and the exterior surface may be in a range of approximately 2 to 7 Shore A.

According to another aspect of the invention, there is provided a process for manufacturing a press jacket which includes using a cylindrical casting mold having an exterior surface, setting a temperature of the cylindrical casting mold which is colder than an elastomeric material being cast, casting a hollow cylindrical sleeve from the elastomeric material on the casting mold, such that the elastomeric material contains at least one crystallization component, embedding one of reinforcement threads and reinforcement fabric in the elastomeric material, providing the sleeve with an interior cylindrical surface and an exterior cylindrical surface, such that the internal surface is formed against the external surface of the cylindrical casting mold, wherein the internal surface of the sleeve is harder than the external surface of the jacket.

According to still another aspect of the invention, there is provided a process for manufacturing a press jacket which includes providing a cylindrical casting mold having a hollow internal surface, such that the casting mold has a temperature which is colder than an elastomeric material being cast, casting a hollow cylindrical sleeve from the elastomeric material on the casting mold, such that the elastomeric material contains at least one crystallization component, embedding one of reinforcement threads and reinforcement fabric in the elastomeric material, providing the sleeve with an interior cylindrical surface and an exterior cylindrical surface, such that the external surface is formed against the hollow internal surface of the hollow cylindrical casting mold, wherein the external surface of the sleeve is harder than the external surface of the sleeve. The process may provide that the mold temperature is between approximately 10 and 100° C. colder than a temperature of the elastomeric material being cast. Additionally, the mold temperature may be between approximately 20 and 80° C. colder than a temperature of the elastomeric material being cast. Alternatively, the mold temperature may be between approximately 10 and 100° C. colder than a temperature of the elastomeric material being cast. The mold temperature may also ideally be between approximately 20 and 80° C. colder than a temperature of the elastomeric material being cast.

The invention also provides for a roll press jacket which includes a hollow cylindrical sleeve made of an castable elastomeric material containing at least one crystallization component, such that the sleeve has an interior cylindrical surface and an exterior cylindrical surface, wherein the internal surface and the external surface have different hardness characteristics. The jacket may further include one of reinforcement threads and reinforcement fabric embedded in the elastomeric material. The one of reinforcement threads and reinforcement fabric may include one of polyester, polyamid, and aramid. The jacket may be made using a casting mold which is colder than the elastomeric material being cast. Moreover, the interior side may have a hardness in the range of approximately 92 to 96 shore A. Additionally, the interior side may have a hardness in the range of approximately 94 to 98 shore A. The exterior side may have a hardness in the range of approximately 92 to 96 shore A. The exterior side may also have a hardness in the range of approximately 94 to 98 shore A. Furthermore, the cold casting mold may be positioned against the interior surface so as to cause a greater crystallization to occur in on the interior surface relative to the exterior surface. The greater crystallization may correspond to greater hardness. The cold casting mold may be positioned against the exterior surface so as to cause a greater crystallization to occur in on the exterior surface relative to the interior surface. The greater crystallization may further correspond to greater hardness.

The jacket may be used for one of dewatering and smoothing a fibrous material web. The crystallization component may include a polymer. The polymer may be a prepolymer. The prepolymer may include diphenylmethan or diisozyanate (MDI) with polyester. Moreover, the elastomer material may include polyurethane. The jacket may provide for difference between the hardness of the interior surface and the exterior surface to be in a range of approximately 2 to 7 Shore A. The interior side may have a hardness in the range of approximately 92 to 96 shore A. The interior side may also have a hardness in the range of approximately 94 to 98 shore A. Furthermore, the exterior side may have a hardness in the range of approximately 92 to 96 shore A. The exterior side may also have a hardness in the range of approximately 94 to 98 shore A.

The invention also provides for a process for manufacturing a press jacket which includes using a cylindrical casting mold having an exterior surface, setting a temperature of the cylindrical casting mold which is colder than an elastomeric material being cast, casting a hollow cylindrical sleeve from the elastomeric material on the casting mold, such that the elastomeric material containing at least one crystallization component, providing the sleeve with an interior cylindrical surface and an exterior cylindrical surface, such that the internal surface is formed against the external surface of the cylindrical casting mold, wherein the internal surface of the sleeve is harder than the external surface of the sleeve. The method may also provide for embedding one of reinforcement threads and reinforcement fabric in the elastomeric material. Moreover, the mold temperature may be between approximately 10 and 100° C. colder than a temperature of the elastomeric material being cast. The mold temperature may also be between approximately 20 and 80° C. colder than a temperature of the elastomeric material being cast.

According to another aspect of the invention, there is provided a process for manufacturing a press jacket which includes using a cylindrical casting mold having a hollow internal surface, setting a temperature of the cylindrical casting mold which is colder than an elastomeric material being cast, the temperature being maintained, casting a hollow cylindrical sleeve from the elastomeric material on the casting mold, such that the elastomeric material contains at least one crystallization component, providing the sleeve with an interior cylindrical surface and an exterior cylindrical surface, such that the external surface is formed against the internal surface of the cylindrical casting mold, wherein the external surface of the sleeve is harder than the internal surface of the sleeve. The method may also include embedding one of, reinforcement threads and reinforcement fabric in the elastomeric material.

The process may provide that the mold temperature is between approximately 10 and 100° C. colder than a temperature of the elastomeric material being cast. The mold temperature may also be between approximately 20 and 80° C. colder than a temperature of the elastomeric material being cast.

The invention also provides for a cylindrical press jacket for treating a material web, which includes a hollow cylindrical sleeve made of an castable elastomeric material containing a prepolymer, the sleeve having an interior cylindrical surface and an exterior cylindrical surface, one of reinforcement threads and reinforcement fabric embedded in the elastomeric material, wherein the jacket is made using a cylindrical casting mold which is maintained at a temperature that is approximately 20 to 80° C. colder than the elastomeric material being cast, such that a sleeve surface which is formed against the casting mold has a hardness in the range of approximately 2 to 7 Shore A greater than a sleeve surface which does not contact the casting mold.

Moreover the invention also provides for a process for manufacturing a press jacket which includes using a cylindrical casting mold having a casting surface, setting a temperature of the cylindrical casting mold which is colder than an elastomeric material being cast, wherein the mold has a temperature which is maintained at a temperature approximately 20 to 80° C. that is colder than an elastomeric material being cast, casting a hollow cylindrical sleeve from the elastomeric material on the casting mold, wherein the elastomeric material contains a prepolymer, providing the sleeve with an interior cylindrical surface and an exterior cylindrical surface, with either one of the external and internal surfaces being formed against the casting surface of the cylindrical casting mold, creating greater crystallization in the sleeve surface which contacts the cold mold surface, wherein the greater crystallization corresponds to greater hardness in the sleeve surface relative to other portions of the elastomer material, such that the greater hardness is in the range of approximately 2 to 7 Shore A.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
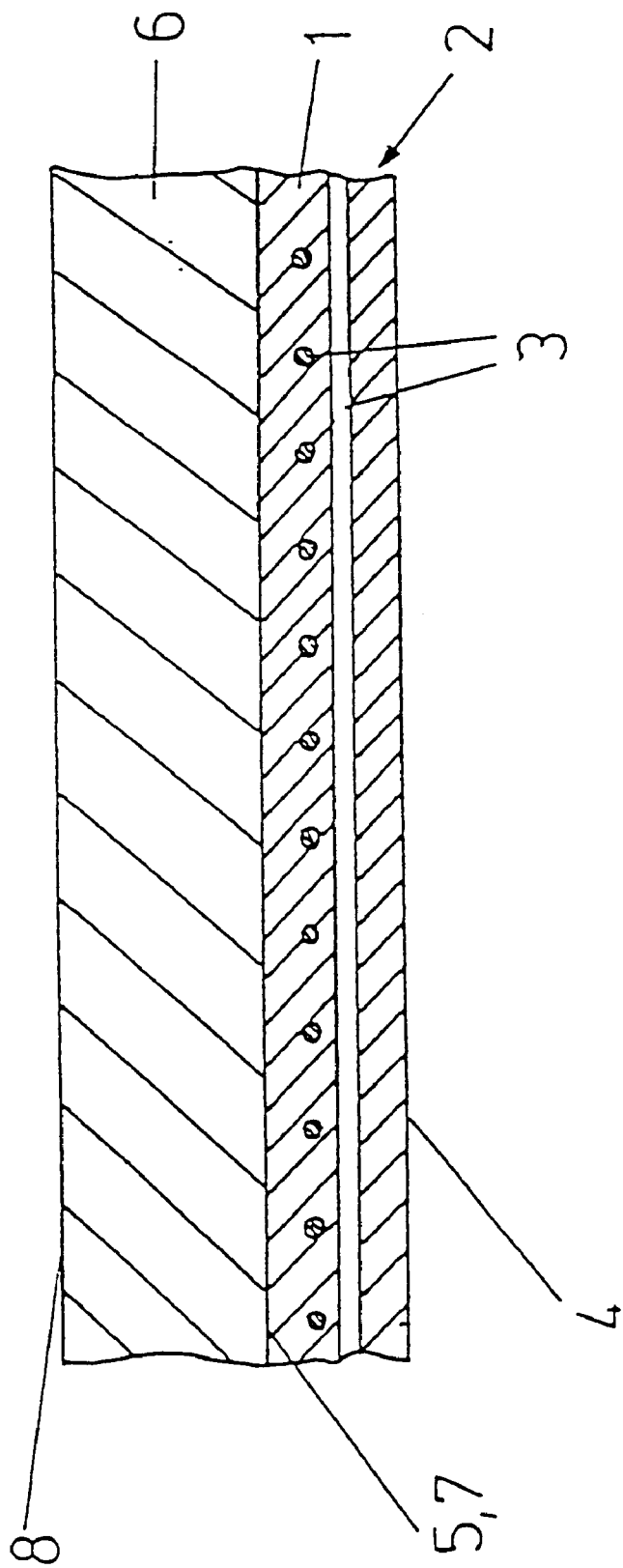
FIG. 1 shows a cross-section of a press jacket formed on a mold.

The invention is explained below in reference to an exemplary embodiment. In the attached drawings, FIG. 1 shows a schematic partial section through tubular press jacket 2 as well as cylindrical casting mold 6. Press jacket 2 is between approximately 5 and 6 mm thick, the interior side is smooth, and the exterior side is usually provided with blind holes or grooves.

A castable elastomeric material 1, e.g., polyurethane, of press jacket 2 is supplemented by a prepolymer, such as diphenylmethan—diisozyanate (MDI) with polyester, which causes stronger crystallization and a higher proportion of hard segments in the area of casting mold 6 during casting onto a colder casting mold 6.

Press jacket 2 contains reinforcement threads 3 running lengthwise and crosswise, which are completely surrounded by elastomeric material 1.

Elastomeric material 1 is generally processed in the conventional manner at temperatures between approximately 50 and 100° C., except that the temperature of casting mold 6 is between approximately 20 and 80° C. less than the temperature of elastomeric material 1.

Figure 3:
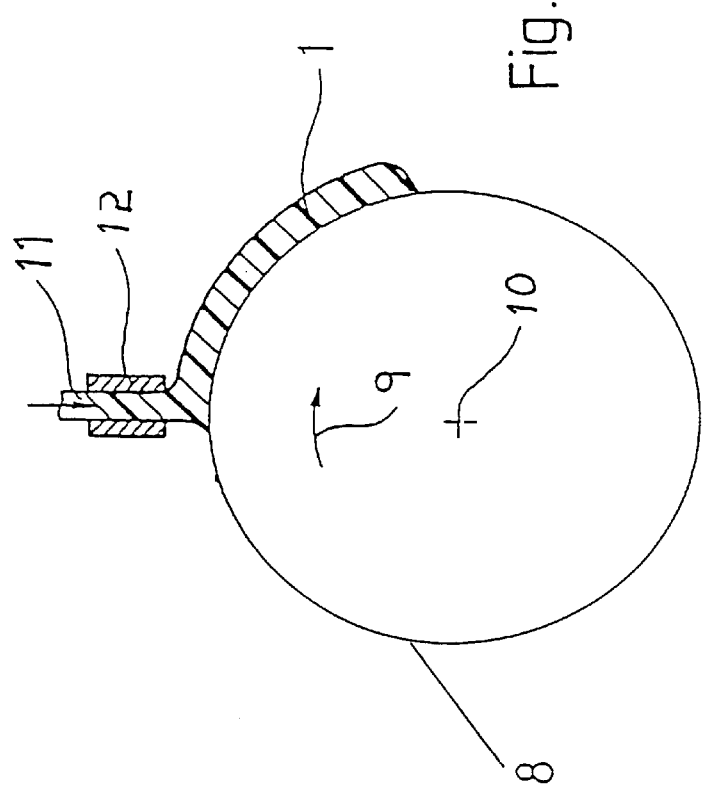
FIG. 3 shows the jacket formed on an exterior surface of cylindrical casting mold.
Figure 2:
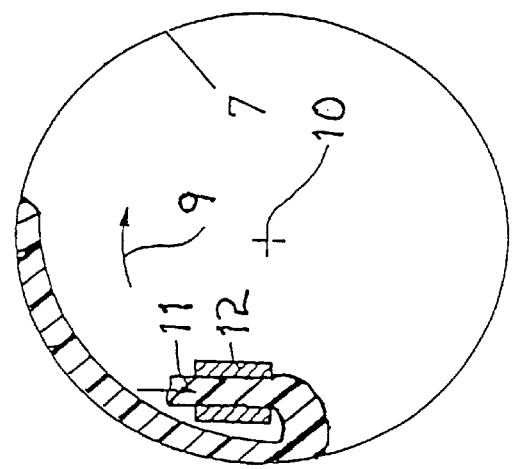
FIG. 2 shows the jacket formed on an interior surface of cylindrical casting mold.

In one example shown in FIG. 2, press jacket 2 with a harder exterior side 5 is manufactured. This is accomplished by applying elastomeric material 1 to interior side 7 of a cylindrical casting mold 6, e.g., a metal mold. However, it is noted that if the interior side 4 is to be made harder, elastomeric material 1 is applied instead to exterior side 8 of the same of cylindrical casting mold 6, as is shown in FIG. 3. Alternatively, different mold designs may be used to for casting each side differently without departing from the scope and sprit of the present invention.

Reinforcement threads 3, e.g., include polyester, polyamid, and/or aramid fibers, may provide an insulating effect, in which the effect of the temperature of casting mold 6 is limited to an area between the threads and the mold contact surface. Thus, only this area becomes harder, e.g., in the exemplary embodiment, the area of exterior side 5 of press jacket 2. It is noted that mold 6 is very heavy, e.g., 15–20 tons, which enables the temperature to remain substantially constant during the casting process. In this respect, mold 6 can be preheated to a desired temperature, i.e., before the casting process, to a certain temperature.

The result is that differences in hardness between interior side 4 and exterior side 5 of press jacket 2 can be produced ranging from approximately 2 to 7 Shore A. The differences in the hardness between interior side 4 and exterior side 5 should be tailored to the particular needs of web making process. For example, the hardness values of one side may range from approximately 92 to 96 shore A, while the other side may have a hardness of approximately 94 to 98 shore A.

FIG. 2 shows in a very basic way how press jacket 2 is formed with a harder exterior side 5. Cylindrical casting mold 6 has interior side 7 against which elastomer material 1 is applied. Elastomer material 1 is fed at increased temperature through line 11 and through a first casting nozzle 12, while cylindrical casting mold 6 is rotated about its central axis 10, in the direction indicated by arrow 9. Nozzle 12 may further be slid in a direction parallel to central axis 10 in order to gradually produce press jacket 2 in a continuous process.

FIG. 3 shows the same process as FIG. 2 except that elastomer material is applied to exterior side 8 of cylindrical casting mold 6.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for manufacturing a press jacket in an apparatus that includes a cylindrical casting mold having a hollow internal surface, said process comprising:
   setting a temperature of the cylindrical casting mold which is colder than an elastomeric material being cast;
   casting a hollow cylindrical sleeve from the elastomeric material on the casting mold, the elastomeric material containing at least one crystallization component, the hollow cylindrical sleeve including an external surface which is formed against the hollow internal surface of the cylindrical casting mold; and
   embedding at least one of reinforcement threads and reinforcement fabric in the elastomeric material,
   whereby said external surface of said hollow cylindrical sleeve is harder than an internal surface of said sleeve.

2. The process of claim 1, wherein the cylindrical casting mold temperature is between approximately 10 and 100° C. colder than a temperature of the elastomeric material being cast.

3. The process of claim 2, wherein the cylindrical casting mold temperature is between approximately 20 and 80° C. colder than a temperature of the elastomeric material being cast.

4. A process for manufacturing a press jacket in an apparatus that includes a cylindrical casting mold having an exterior surface, said process comprising:
   setting a temperature of the cylindrical casting mold which is colder than an elastomeric material being cast;
   casting a hollow cylindrical sleeve from the elastomeric material on the casting mold, the elastomeric material containing at least one crystallization component, the hollow cylindrical sleeve including an internal surface which is formed against the external surface of the cylindrical casting mold; and
   embedding at least one of reinforcement threads and reinforcement fabric in the elastomeric material;
   whereby the internal surface of the hollow cylindrical sleeve is harder than an external surface of the hollow cylindrical sleeve.

5. The process of claim 4, wherein the cylindrical casting mold temperature is between approximately 10 and 100° C. colder than a temperature of the elastomeric material being cast.

6. The process of claim 5, wherein the cylindrical casting mold temperature is between approximately 20 and 80° C. colder than a temperature of the elastomeric material being cast.

7. A process for manufacturing a press jacket in an apparatus that includes a cylindrical casting mold having an external surface, said process comprising:
   setting a temperature of the cylindrical casting mold which is colder than an elastomeric material being cast; and
   casting a hollow cylindrical sleeve from the elastomeric material on the casting mold, the elastomeric material containing at least one crystallization component, the hollow cylindrical sleeve including an internal surface which is formed against the external surface of the cylindrical casting mold;
   wherein said internal surface of said hollow cylindrical sleeve is harder than an external surface of said hollow cylindrical sleeve.

8. The process of claim 7, further comprising:
   embedding at least one of reinforcement threads and reinforcement fabric in the elastomeric material.

9. The process of claim 7, further comprising:
   setting the mold temperature between approximately 10 and 100° C. colder than a temperature of the elastomeric material being cast.

10. The process of claim 9, further comprising:
    setting the mold temperature between approximately 20 and 80° C. colder than a temperature of the elastomeric material being cast.

11. A process for manufacturing a press jacket in an apparatus that includes a cylindrical casting mold having a hollow internal surface, said process comprising:
    setting a temperature of the cylindrical casting mold which is colder than an elastomeric material being cast;
    casting a hollow cylindrical sleeve from the elastomeric material on the cylindrical casting mold, the elastomeric material containing at least one crystallization component, the hollow cylindrical sleeve including an external surface which is formed against the internal surface of the cylindrical casting mold,
    wherein said external surface of said hollow cylindrical sleeve is harder than an internal surface of said hollow cylindrical sleeve.

12. The process of claim 11, further comprising:
    embedding at least one of reinforcement threads and reinforcement fabric in said elastomeric material.

13. The process of claim 11, further comprising:
    setting the mold temperature between approximately 10 and 100° C. colder than a temperature of the elastomeric material being cast.

14. The process of claim 13, further comprising:
    setting the mold temperature between approximately 20 and 80° C. colder than a temperature of the elastomeric material being cast.

15. A process for manufacturing a press jacket in an apparatus that includes a cylindrical casting mold having at least one casting surface, said process comprising:
    setting a temperature of the cylindrical casting mold which is colder than an elastomeric material being cast, said cylindrical casting mold having a temperature which is maintained at a temperature approximately 20 to 80° C. colder than the elastomeric material being cast;
    casting a hollow cylindrical sleeve from the elastomeric material on the cylindrical casting mold, the elastomeric material containing a prepolymer, such that the hollow cylindrical sleeve is provided with an interior cylindrical surface and an exterior cylindrical surface, wherein one of said external surface and said internal surface is formed against said casting surface;
    creating greater crystallization in a sleeve surface which contacts said casting surface;
    wherein the greater crystallization corresponds to greater hardness in said sleeve surface relative to other portions of the elastomer material, the greater hardness being in the range of approximately 2 to 7 Shore A.

* * * * *